United States Patent
Hara et al.

(10) Patent No.: US 7,118,169 B2
(45) Date of Patent: Oct. 10, 2006

(54) FRONT PILLAR GARNISH

(75) Inventors: Kengo Hara, Aichi (JP); Koichi Sakamoto, Saitama (JP)

(73) Assignees: Tokai Kogyo Co., Ltd., Obu (JP); Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 11/038,252

(22) Filed: Jan. 21, 2005

(65) Prior Publication Data

US 2005/0189780 A1  Sep. 1, 2005

(30) Foreign Application Priority Data

Jan. 22, 2004  (JP)  ............... 2004-014435

(51) Int. Cl.
*B60J 7/00*  (2006.01)
(52) U.S. Cl. ............ 296/208; 296/93; 296/146.9
(58) Field of Classification Search ............ 296/208, 296/93, 146.15
See application file for complete search history.

(56) References Cited

U.S. PATENT DOCUMENTS

| | | | | |
|---|---|---|---|---|
| 4,047,751 A | * | 9/1977 | Koike | 296/93 |
| 4,060,272 A | * | 11/1977 | Mori | 296/93 |
| 5,317,835 A | * | 6/1994 | Dupuy et al. | 49/441 |
| 5,396,733 A | * | 3/1995 | Dupuy | 49/441 |
| 5,451,090 A | * | 9/1995 | Brodie et al. | 296/93 |
| 5,493,814 A | * | 2/1996 | Christian | 49/440 |
| 5,702,148 A | * | 12/1997 | Vaughan et al. | 296/146.9 |
| 5,791,722 A | * | 8/1998 | Nozaki et al. | 296/146.9 |
| 6,279,987 B1 | * | 8/2001 | Keeney et al. | 296/146.9 |
| 6,612,074 B1 | * | 9/2003 | Kaye et al. | 49/441 |
| 6,708,450 B1 | * | 3/2004 | Tanaka et al. | 49/441 |
| 2004/0212216 A1 | * | 10/2004 | Kagawa | 296/146.15 |

FOREIGN PATENT DOCUMENTS

JP  2003-54262  2/2003

* cited by examiner

*Primary Examiner*—Kiran B. Patel
(74) *Attorney, Agent, or Firm*—Westerman, Hattori, Daniels & Adrian, LLP.

(57) ABSTRACT

A front pillar garnish includes an ornamental head portion having an inward end, a groove wall protruding the ornamental head portion toward a window pane and defining a rain water gutter in cooperation with a surface of the window pane, and amounting leg portion protruding from the ornamental head portion toward a gap between the window pain and a front pillar for mounting the front pillar garnish. The groove wall includes first and second groove walls respectively positioned at an upper side and a lower side in a longitudinal direction of the front pillar garnish. A maximum distance in a direction toward an outer peripheral end face of the window pane from the inward end of the ornamental head portion to the second groove wall is larger than a maximum distance from the inward end of the ornamental head portion to the first groove wall.

9 Claims, 9 Drawing Sheets

FRONT PILLAR GARNISH

BACKGROUND OF THE INVENTION

1. Field of the Invention

The present invention relates to a front pillar garnish to be attached along a front pillar that constitutes a portion of a window opening of a vehicle body for covering a gap between a front window pane and the front pillar.

2. Description of the Related Art

Various constitutions of the front pillar garnish (hereafter also called as "pillar garnish") have been proposed and known (for example, see JP-A-2003-54262). A pillar garnish disclosed in JP-A-2003-54262 integrally includes an ornamental head portion separated from a window pane surface to a vehicle exterior side and covering the gap at the separated position from the vehicle exterior side when the pillar garnish is attached to a predetermined position of a body panel, a groove wall defining a rain water gutter in cooperation with the window pane surface by being protruded from a back surface side of an inward portion of the ornamental head portion, and a mounting leg portion protruded from a back surface side of an outward portion of the ornamental head portion to the window pane surface for mounting the pillar garnish to an outer peripheral edge of the window pane and/or to the window opening of the body panel.

In the pillar garnish of the above-described constitution, in order to ensure safety particularly in running under rainy weather, it is desired to excellently secure a field of view of the front window as well as a field of view of a side window while preventing water droplets wiped at the front window by a wiper blade from flowing to the side window by efficiently receiving the water droplets. If a volume of the rain water gutter is enlarged, the water droplets wiped at the front window can be prevented from flowing to the side window. In enlarging the volume, a height of the rain water gutter that extends to a lower side may be increased, however, there is a limit in an allowable height in view of design and whistling sound that is generated during running.

On the other hand, in order to enlarge the front field of view in running under rainy weather, an area wiped by the wiper blade needs to be increased. That can be achieved if a length of the wiper blade is prolonged, however, there is a concern that in operating the wiper, particularly when the wiper reaches a lowest side, (when wiper is stopped), the wiper interferes with the pillar garnish. Even when the wiper blade does not interfere with the pillar garnish, there is a concern that a tip end of the wiper blade is brought into the rain water gutter of the pillar garnish to close the gutter. In this case, a water flow flowing in a skewed lower direction while being guided by the rain water gutter for each pivotal movement of the wiper blade may be blocked, and rainwater overflowed from the rain water gutter may flow toward the side window by riding over the ornamental head portion.

SUMMARY OF THE INVENTION

In view of the above-described problem, an object of the present invention is to provide a pillar garnish capable of ensuring a wide field of view in running under rainy weather and capable of securing a sufficient volume of rain water gutter for making rainwater on a window pane wiped and collected by a wiper smoothly flow along the rain water gutter of the pillar garnish and preventing a lateral flow of rainwater toward a side window.

According to a first aspect of the invention, there is provided a front pillar garnish including: an ornamental head portion that is separate from a surface of a window pane to a vehicle exterior side and covers a gap between an outer peripheral end face of the window pane and a window opening formed in a body panel when the front pillar garnish is mounted to the predetermined position of the body panel, the ornamental head portion having an inward end; a groove wall that protrudes from a back surface side of the ornamental head portion toward the surface of the window pane and defines a rain water gutter in cooperation with the surface of the window pane; and a mounting leg portion that protrudes from the back surface side of the ornamental head portion toward the gap for mounting the front pillar garnish to an outer peripheral edge of the window pane and/or to the window opening of the body panel; wherein the groove wall includes: a first groove wall that is positioned at an upper side in a longitudinal direction of the front pillar garnish when the front pillar garnish is mounted to the predetermined position of the body panel; and a second groove wall that is positioned at a lower side in the longitudinal direction of the front pillar garnish when the front pillar garnish is mounted to the predetermined position of the body panel; wherein a maximum distance in a direction toward the outer peripheral end face of the window pane from the inward end of the ornamental head portion to the second groove wall is larger than a maximum distance in the direction toward the outer peripheral end face of the window pane from the inward end of the ornamental head portion to the first groove wall to thereby make a depth of the rain water gutter large at the lower side in the longitudinal direction of the front pillar garnish; and wherein when a tip end of a wiper blade reaches the lowest position, the surface of the window pane, the tip end of the wiper blade and the second groove wall define a water flow path through which water is allowed to flow along the rain water gutter.

According to the above structure, the groove wall includes the first groove wall constituting the upper side in the longitudinal direction and the second groove wall constituting the lower side in a state where the pillar garnish is attached to a predetermined position of the body panel. Further, the distance from the inward end of the ornamental head portion to the second groove wall is larger than the distance from the inward end to the first groove wall such that the depth of the rain water gutter opened inwardly becomes deeper at the lower side in the longitudinal direction of the pillar garnish. Thus, in running under rainy weather, even when the tip end of the wiper blade, which is reciprocally and pivotally moved while a fulcrum thereof is positioned at substantially a center in a vehicle width direction, reaches to a position proximate to the pillar garnish and the wiper blade is brought into a posture substantially parallel to a horizontal line, a predetermined space is defined between the tip end and the second groove wall. As a result, the position of the tip end of the wiper blade can further be lowered and the wiper blade can be made more proximate to horizontal, so that the wiping area of the wiper can be widened. Therefore, an excellent front field of view can be ensured in running under rainy weather. Further, the depth of the rain water gutter is deepened on the lower side in the longitudinal direction of the pillar garnish. Thus, since the volume of the rain water gutter becomes larger on the lower side than on the upper side of the pillar garnish, water collected by the wiper is made to flow to the upper side or to the lower side along the water flow path defined by the surfaces of the window pane, the tip end of the wiper blade and the second groove wall. Therefore, water can be prevented from flowing laterally toward the side window by riding over the ornamental head portion.

A second aspect of the invention is characterized in that the front pillar garnish is attachable to a left side front pillar of a vehicle with a right-hand steering wheel or to a right side front pillar of a vehicle with a left-hand steering wheel.

Further, a third aspect of the invention is characterized in that the second groove wall is located at a position that is lower than an intermediate portion of the front pillar garnish in the longitudinal direction of the front pillar garnish, and a distance between the inward end of the ornamental head portion and the second groove wall is made larger than a distance between the inward end of the ornamental head portion and the first groove wall.

According to the third aspect, in addition to effects achieved by the first or second aspect of the invention, on a side of the pillar garnish upward from the middle portion in the longitudinal direction, the pillar garnish is brought into contact with the window pane at a portion thereof (inner side) inward from the lower side. Therefore, a stability of attaching the pillar garnish is not deteriorated.

Further, a fourth aspect of the invention is characterized in that the first groove wall and the second groove wall are curvedly connected. A fifth aspect of the invention is characterized by further including a transitional groove wall that connects the first groove wall and the second groove wall and extends in a direction that crosses an extending direction of the first groove wall. A sixth aspect of the invention is characterized in that the second groove wall is connected to the first groove wall while extending in a direction that crosses an extending direction of the first groove wall. According to these aspects, in addition to effects achieved by the third aspect of the invention, both of bending rigidity and torsional rigidity of the pillar garnish are increased.

Further, a seventh aspect of the invention is characterized in that a height of the groove wall which is a distance between a base end portion of the groove wall on the back surface side of the ornamental head portion and the surface of the window pane is made higher in the second groove wall than in the first groove wall.

According to the seventh aspect, in addition to the above effects, the volume of the rainwater gutter is further increased as proceeding to the lower side in the longitudinal direction of the front pillar, so that water collected by the wiper blade is facilitated to flow along the water flow path and water can further effectively be prevented from flowing toward the side window by riding over the ornamental head portion.

Further, an eighth aspect of the invention is characterized by further including a cushion member made of a polymer material that is softer than a material of the groove wall, the cushion member being attached to a top end portion of the groove wall on a window pane side. Thus, in addition to the above effects, in a state where the front pillar garnish is attached to the front pillar, the groove wall is brought into elastic contact with the window pane via the cushion member, so that adherence of the window pane and the groove wall is promoted and the contact portion of the window pane is protected.

Further, a ninth aspect of the invention is characterized in that the second groove wall includes: a vehicle exterior side portion on an ornamental head portion side; and a vehicle interior side portion on a window pane surface side, the vehicle interior side portion having a height larger than a thickness of the wiper blade, the vehicle interior side portion being positioned closer to a window pane outer peripheral edge side in a width direction of the front pillar garnish than the vehicle exterior side portion; and a connecting portion that connects the vehicle exterior side portion and the vehicle interior side portion in a stepwise manner. Thus, in addition to the above effects, in operating the wiper blade, the pillar garnish is prevented from interfering with the wiper blade, and also a torsional strength or the like of the second groove wall can be increased.

According to the pillar garnish of the invention, in running under rainy weather, even when the tip end of the wiper blade, which is reciprocally and pivotally moved while a fulcrum thereof is positioned at substantially a center in a vehicle width direction, reaches to a position proximate to the pillar garnish and the wiper blade is brought into a posture substantially parallel to a horizontal line, a predetermined space is defined between the tip end and the second groove wall. Therefore, the position of the tip end of the wiper blade can further be lowered and the wiper blade can be made more proximate to horizontal, so that the wiping area of the wiper can be widened. Therefore, an excellent front field of view can be ensured in running under rainy weather. Further, the depth of the rain water gutter is deepened on the lower side in the longitudinal direction of the pillar garnish. Thus, since the volume of the rain water gutter becomes larger on the lower side of the pillar garnish, water collected by the wiper is made to flow to the upper side or to the lower side along the water flow path defined by the surfaces of the window pane, the tip end of the wiper blade and the second groove wall. Therefore, water can be prevented from flowing laterally toward the side window by riding over the ornamental head portion.

DETAILED DESCRIPTION OF THE PREFERRED EMBODIMENTS

The invention will be described in detail by showing embodiments as follows.

[First Embodiment]

Figure 1:
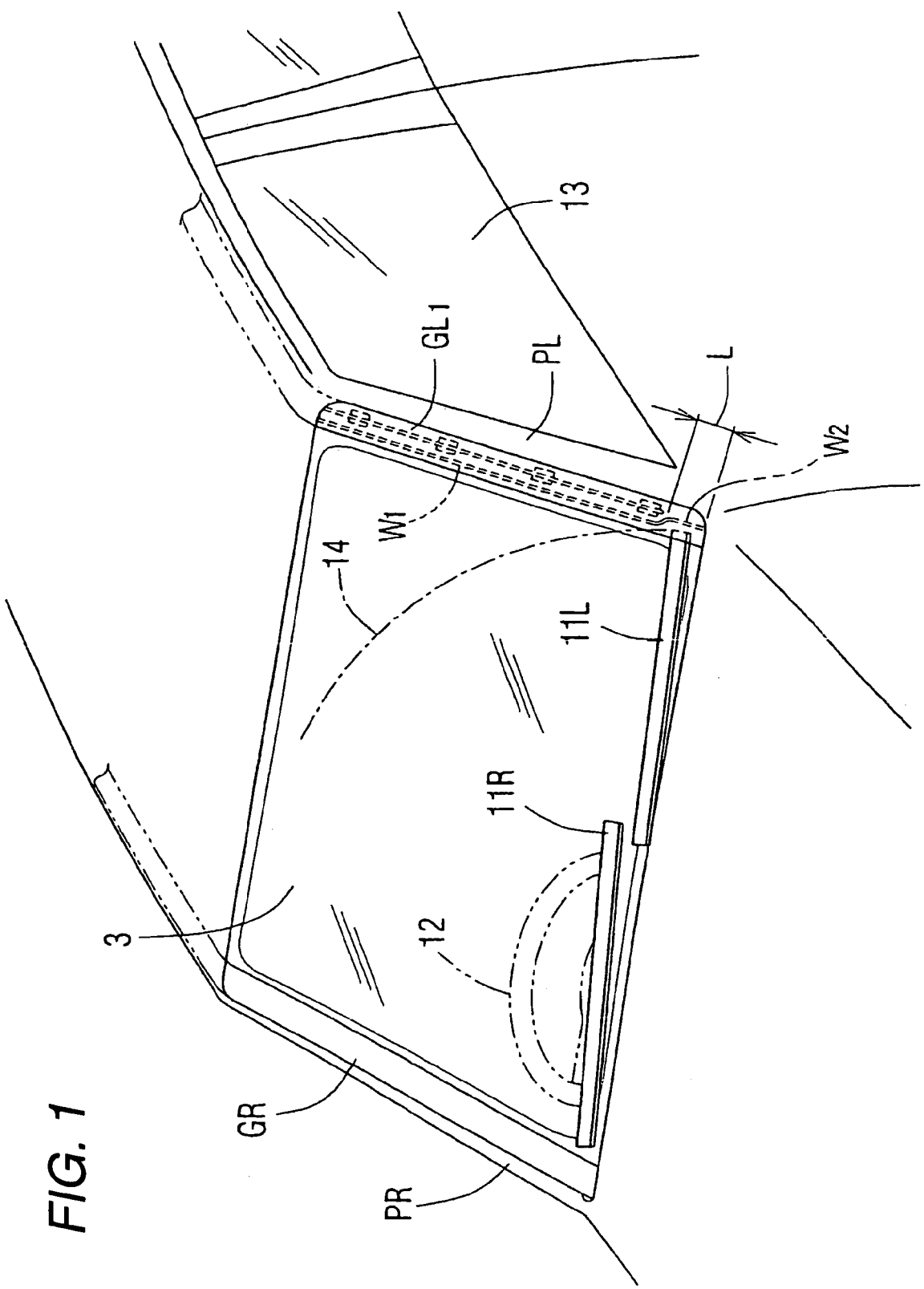
FIG. 1 is a perspective view viewed from a skewed upper direction and showing a portion of a front window of an automobile in which a pillar garnish according to a first embodiment of the invention is attached to a front pillar on a left side.
Figure 2:
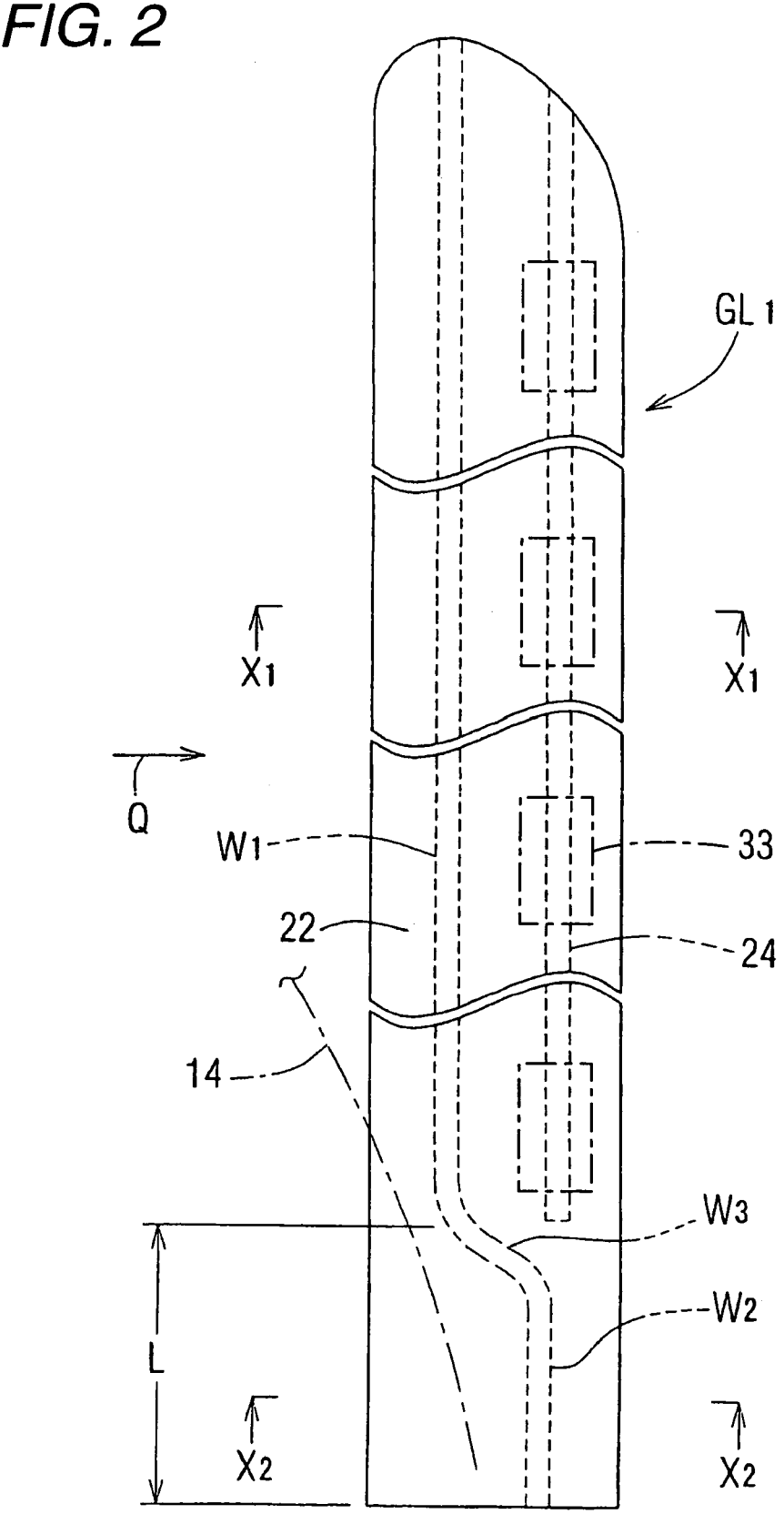
FIG. 2 is a schematic front view of the pillar garnish on the left side.
Figure 3:
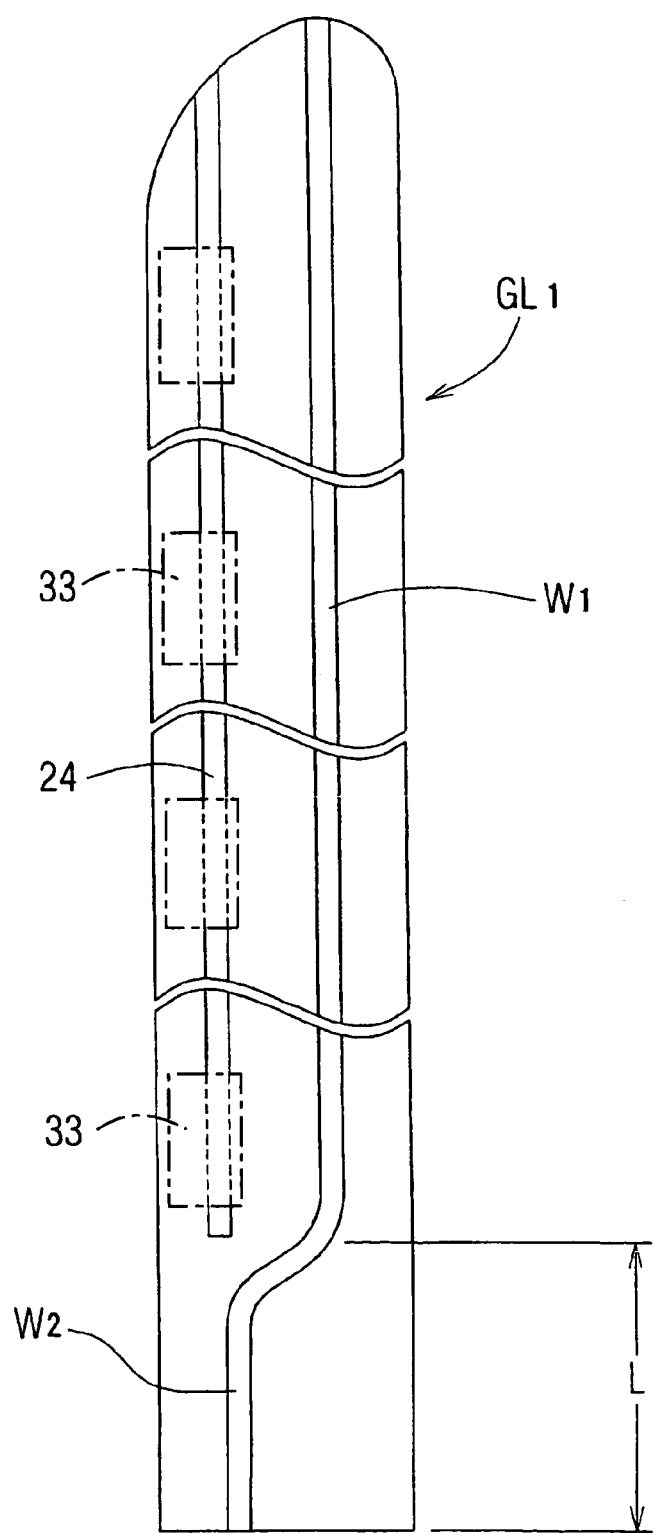
FIG. 3 is a schematic rear view of the pillar garnish.
Figure 4:
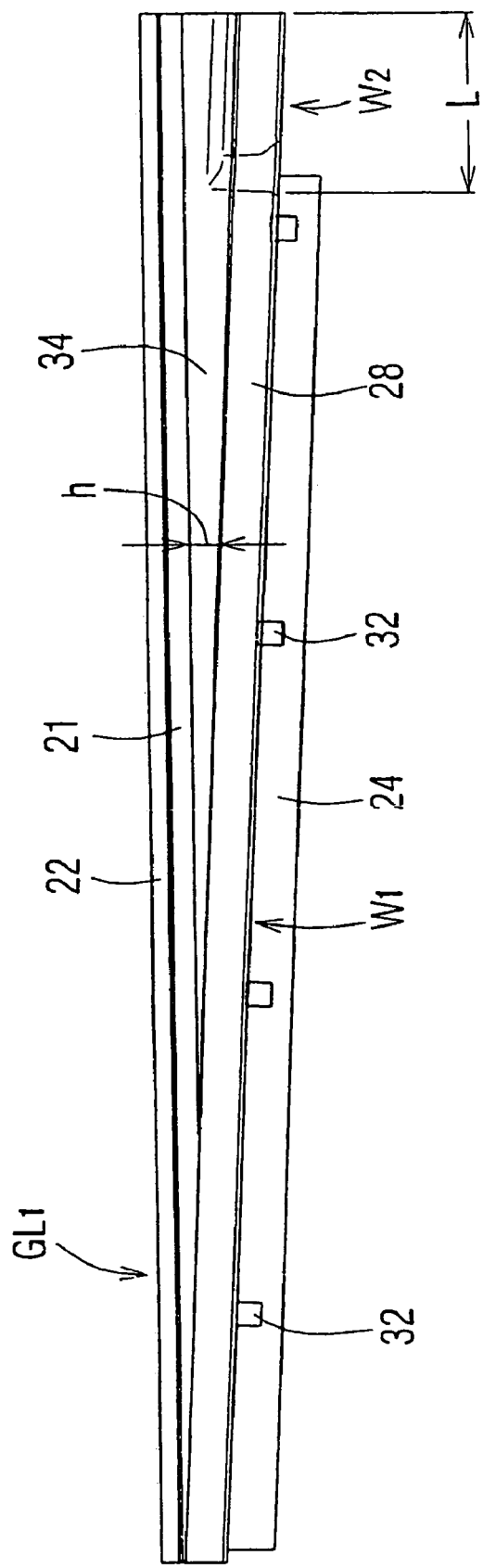
FIG. 4 is a schematic view (schematic side view) viewed from a Q arrow mark direction in FIG. 2.
Figure 5:
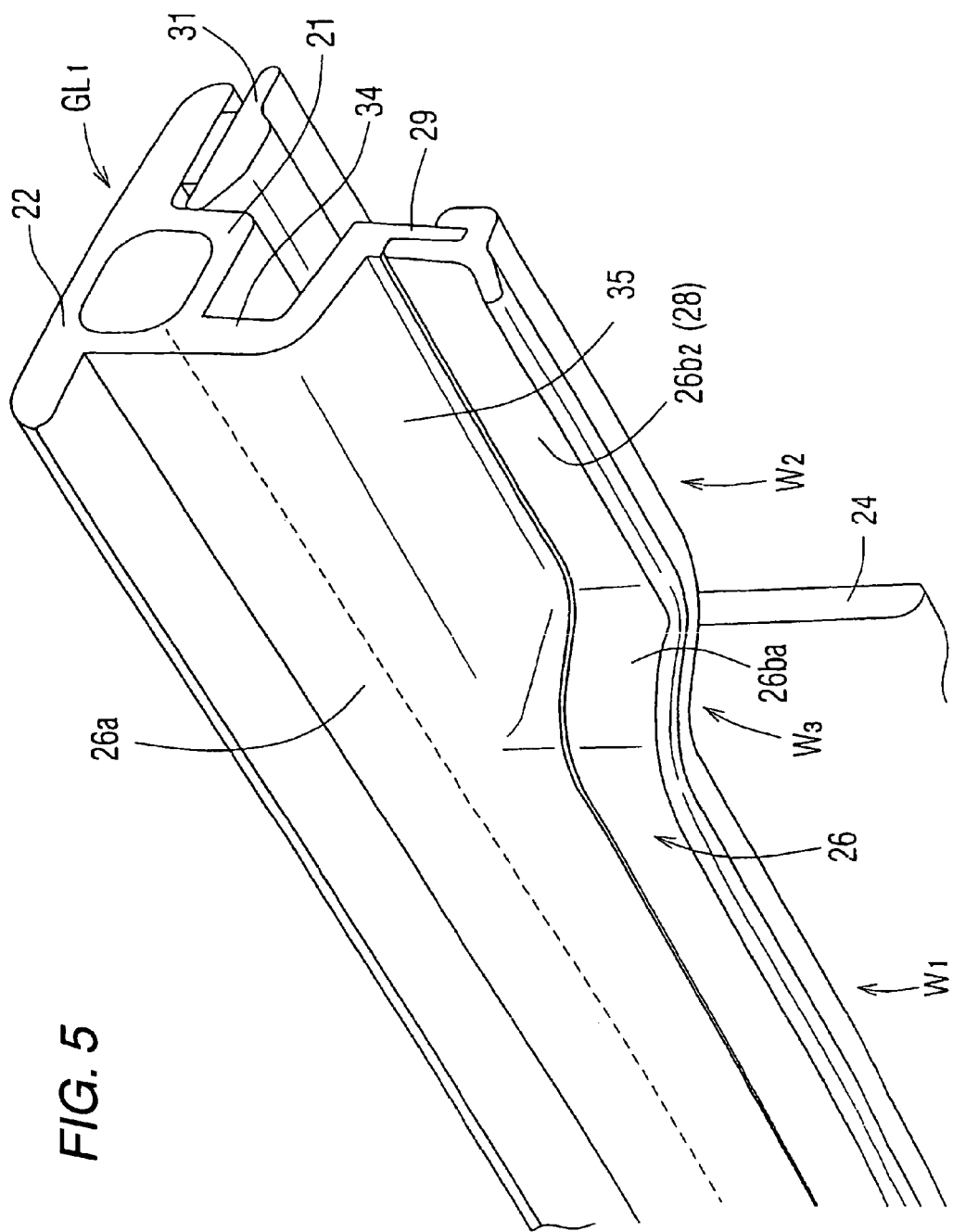
FIG. 5 is a partial perspective view viewed from a skewed lower direction and showing a portion of a second groove wall at a lower end portion of the pillar garnish on the left side.
Figure 6:
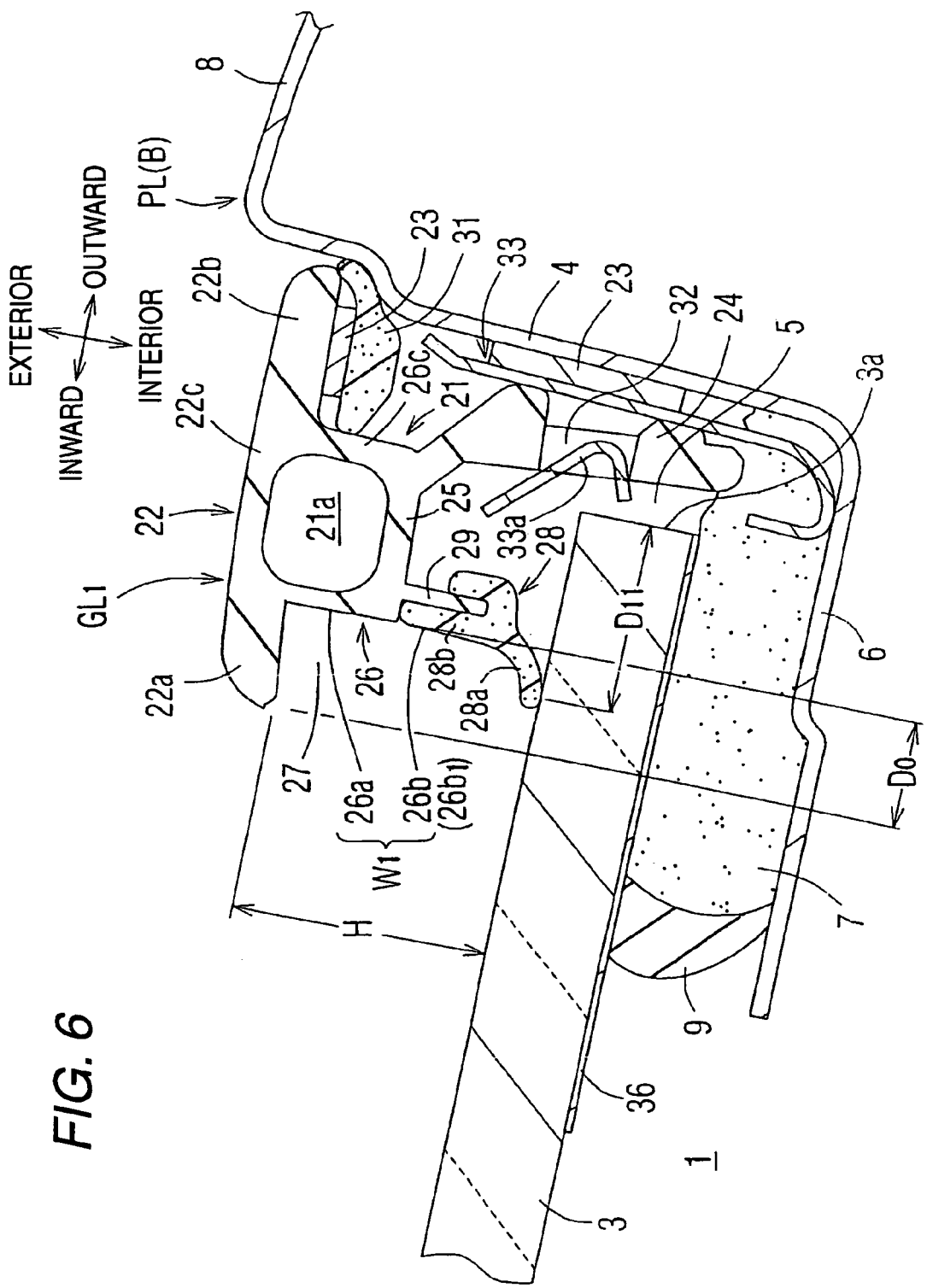
FIG. 6 is an enlarged sectional view taken along a line $X_1$—$X_1$ in FIG. 2 when the pillar garnish on the left side is attached.
Figure 7:
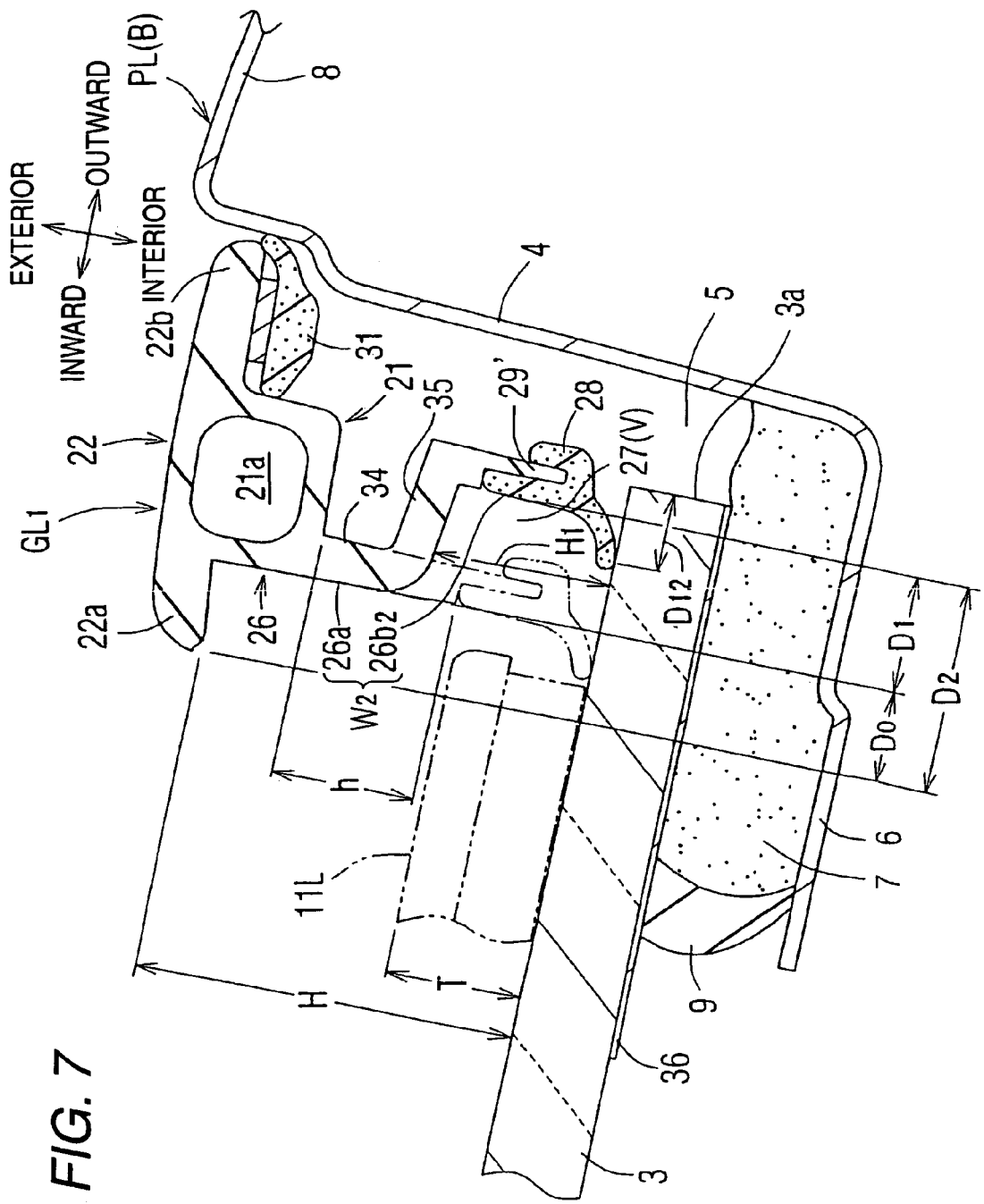
FIG. 7 is an enlarged sectional view taken along a line $X_2$—$X_2$ in FIG. 2 when the pillar garnish on the left side is attached.

FIG. 1 is a perspective view viewed from a skewed upper direction and showing a portion of a front window of an automobile in which a pillar garnish $GL_1$ according to a first embodiment of the invention is attached to a front pillar PL on a left side. FIG. 2 is a schematic front view of the pillar garnish $GL_1$ on the left side. FIG. 3 is a schematic view of aback surface of the pillar garnish $GL_1$ shown FIG. 2. FIG. 4 is a schematic view (schematic side view) viewed from a Q arrow mark direction in FIG. 2. FIG. 5 is a partial perspective view viewed from a skewed lower direction and showing a second groove wall $W_2$ of a lower end portion of the pillar garnish $GL_1$ on the left side. FIG. 6 is an enlarged sectional view taken along a line $X_1$—$X_1$ in FIG. 2 when the pillar garnish $GL_1$ on the left side is attached. FIG. 7 is an enlarged sectional view taken along a line $X_2$—$X_2$ in FIG. 2. As shown in FIG. 1, FIG. 6 and FIG. 7, both side portions of a window opening 1 for the front window of a body panel B are provided with respective left and right front pillars PL, PR inclined rearward relative to a vertical line. The window opening 1 is arranged with a window pane 3 of glass or the like, and a predetermined gap 5 is defined between an outer peripheral end face 3a and a peripheral panel 4 constituting the front pillar PL. The gap 5 is closed by attaching the pillar garnish $GL_1$ to the peripheral panel 4 of the front pillar PL and a left edge of the window pane 3 is shielded from outside of a vehicle. Further, a base flange panel 6 is integrally extended from an end portion on a vehicle interior side of the peripheral panel 4 of the front pillar PL while being bent toward a center of the window opening 1. The window pane 3 is fixed to the base flange panel 6 via an adherence sealant 7. Incidentally, in FIG. 6 and FIG. 7, a reference numeral 8 designates an outer panel of the body panel B constituting the front pillar PL, and a reference numeral 9 designates a dam for preventing the adherence sealant 7 before being cured from flowing in an inward direction.

An automobile shown in FIG. 1 is a vehicle with a right-hand steering wheel, and is provided with a pair of left and right wiper blades 11L, 11R for wiping rainwater on a front face of the window pane in running under rainy weather to collect to sides of the respective front pillars PL at both side edges of the window pane 3. The wiper blade 11R on the right side opposed to a driver is reciprocally pivoted while a fulcrum thereof is located at a lower right end portion of the window pane 3. The wiper blade 11L on the left side opposed to a passenger at a passenger seat is reciprocally pivoted while a fulcrum thereof is located at a lower center portion of the window pane 3. Therefore, when the pair of left and right wiper blades 11L, 11R are brought into a state of being proximate to a horizontal line (state of stopping wiper blades), a tip end of the wiper blade 11L on the left side becomes proximate to the pillar garnish $GL_1$ on the left side. Incidentally, in FIG. 1, a notation GR designates a pillar garnish on the right side, a reference numeral 12 designates a steering wheel, and a reference numeral 13 designates a window pane of a side window.

The pillar garnish $GL_1$ on the left side shown in FIG. 2, FIG. 6 and FIG. 7 is formed of a hard resin material having a rigidity such as PP resin, AES resin, ABS resin or the like, by injection molding. The pillar garnish $GL_1$ includes an ornamental head portion 22 arranged to be separated from a surface of the window pane 3 to a vehicle exterior side for covering the gap from the vehicle exterior side at the separate position, a projection 21 in a shape of a hollow pipe projected from a back surface side of the ornamental head portion 22 to the surface side of the window pane 3, and a mounting leg portion 24 formed to project to a vehicle interior side (toward the gap 5) from an end portion in an outward direction of the projection 21. The projection 21 in the shape of the hollow pipe can be molded by using a publicly-known gas assist injection molding method such as a full shot method or a short shot method, in the injection molding of the pillar garnish $GL_1$. The mounting leg portion 24 is mounted to engage with a clip 33 formed by a spring steel sheet previously adhered to the peripheral panel 4 of the front pillar PL (body panel B) via a thermosetting adhesive tape 23. Although the ornamental head portion 22 is integrally provided with an inward projecting portion 22a and an outward projecting portion 22b, a boundary therebetween is not necessarily clear. The projection 21 has a hollow shape, and a side wall portion thereof on the inward side is made to constitute an upper wall portion 26a. The upper wall portion 26a is provided at a position separate from an inward end edge of the ornamental head portion 22 in an outward direction by a predetermined distance ($D_0$). In a cross-sectional view, a hollow portion 21a is defined by being surrounded by the ornamental head portion 22, the upper wall portion 26a, an outward side wall portion 26c and a back plate portion 25, and is extended in a longitudinal direction. There is formed a rain water gutter 27 for making rainwater, which is collected to a left side edge of the window pane 3 by the wiper blade 11L on the left side, flow to a lower side. The rain water gutter 27 is defined by the surface of the window pane 3, the back surface of the inward projecting portion 22a of the ornamental head portion 22 opposed to the surface of the window pane, the upper wall portion 26a and a lower wall portion 26b which will be described later.

Further, an end portion on the inward side of back surface of the projection 21 is formed with an attaching plate portion 29 for attaching a first cushion piece 28 to be directed toward the surface side of the window pane 3 in a state where the pillar garnish $GL_1$ is attached. A position of the attaching plate portion 29 is displaced in a width direction in the outward direction to constitute the attaching plate portion 29' (refer to FIG. 7) at the lower end portion in the longitudinal direction of the pillar garnish $GL_1$. The first cushion piece 28 is formed by soft thermoplastic elastomer or soft rubber having hardness lower than that of the pillar garnish $GL_1$ and is elastically deformable. The first cushion piece 28 is constituted by an elastic contact portion 28a that is brought into elastic contact with the surface of the window pane 3, and an attached portion 28b attached to the attaching plate portion 29 while inserting the attaching plate portion 29 thereinto. The attached portion 28b has substantially a shape of a letter "U" in a cross-sectional view thereof. In a state where the first cushion piece 28 is attached to the attaching plate portion 29 of the pillar garnish $GL_1$, a face on the inner side of the first cushion piece 28 is substantially flush with a face on the inner side of the upper wall portion 26a, and a portion of connecting the both members 21, 28 is brought into a stepless state. Therefore, the first cushion piece 28 functions also as the lower wall portion 26b and a face thereof on the inward side forms a bottom face of the rain water gutter 27 in cooperation with the face of the inward side of the upper wall portion 26a. Further, a back surface of the outward projected portion 22b of the ornamental head portion 22 is provided with a second cushion piece 31 via the double faced adhesive tape 23. The respective first and second cushion pieces 28, 31 prevent the pillar garnish $GL_1$ from being brought into direct contact with the window pane 3 and the body panel B. The first cushion piece 28 also prevents abnormal noise, which is caused by air leaked between the piece 28 and the window pane 3, from being emitted. The second cushion piece 31 also prevents the body panel B from being damaged.

The mounting leg portion 24 is formed into a shape of a thick plate, and in the state where the pillar garnish $GL_1$ is attached, a lower end portion of the mounting leg portion 24 arranged on the vehicle interior side is arranged to be inserted into the gap 5 between the outer peripheral end face 3a of the window pane 3 and the peripheral panel 4 of the front pillar PL. The mounting leg portion 24 is formed with clip engaging holes 32 (refer to FIG. 4 and FIG. 6) at predetermined intervals along the longitudinal direction, and the clips 33 substantially in a U-like shape are respectively engaged with the respective clip engaging holes 32. The clip 33 is adhered to the peripheral panel 4 of the front pillar PL previously by the adhesive tape 23. In attaching the pillar garnish, the mounting leg portion 24 of the pillar garnish $GL_1$ is inserted into the gap 5. In this state, when the pillar garnish $GL_1$ is pressed to the surface side of the window pane 3, the pillar garnish $GL_1$ is fixedly attached thereto via the plural clips 33 by elastically widening to open engaging portions 33a of the clips 33 and fitting the engaging portions 33a of the clips 33 to the engaging holes 32. In this way, in a state where the pillar garnish $GL_1$ is attached to the peripheral panel 4 of the front pillar PL, the elastic contact portion 28a of the first cushion piece 28 is elastically deformed to be brought into elastic contact with the surface of the window pane 3, and the second cushion piece 31 is brought into elastic contact with a stepped portion proximate to an end portion on the vehicle exterior side of the peripheral panel 4 of the front pillar PL to close respective gaps between the first cushion piece 28 and the window pane 3 and between the second cushion piece 31 and the body panel B.

Further, the groove wall 26 forming the bottom face of the rain water gutter 27 includes the upper groove wall 26a and the lower groove wall 26b along a direction rising from the surface of the window pane 3 to the vehicle exterior side. The groove wall 26 is constituted by a first groove wall $W_1$ on an upper side of the pillar garnish $GL_1$, a second groove wall $W_2$ on a lower side thereof and a transitional groove wall $W_3$ extending from the first groove wall $W_1$ to the second groove wall $W_2$ along the longitudinal direction (up and down direction when attached) (refer to FIG. 2 and FIG. 3). The first and second groove walls $W_1$, $W_2$ are formed to displace along the width direction of the pillar garnish $GL_1$ such that a depth $D_2$ (dimension along a direction in parallel with the surface of the window pane 3) of the rain water gutter 27 (lower groove wall $26b_2$) of the second groove wall $W_2$ becomes deeper than the depth $D_0$ of the rain water gutter 27 of the first groove wall $W_1$. That is, as shown in FIG. 1 and FIGS. 5 to 7, the second groove wall $W_2$ is partially formed at a portion at which the tip end of the wiper blade 11L on the left side may interfere therewith, in other words, at a portion constituting the lower end portion in the longitudinal direction of the pillar garnish $GL_1$ when the pillar garnish $GL_1$ is attached (portion designated by a notation L in FIGS. 1 to 4). The first groove wall $W_1$ is formed at a remaining large portion of the pillar garnish in the longitudinal direction. The lower groove wall $26b_1$ of the first groove wall $W_1$ is steplessly made to be continuous to the upper groove wall 26a formed by the side wall on the inward side of the projection 21 having the hollow portion 21a. The second groove wall $W_2$ is constituted by the upper groove wall 26a, a connecting portion 35 and a lower groove wall $26b_2$ being displaced outwardly from the lower groove wall 26b of the first groove wall $W_1$. In a cross-sectional view, a lower groove wall $26b_a$ of the transitional groove wall $W_3$ constituting a portion of connecting the respective upper and lower groove walls 26a, $26b_2$ is constituted by a stepped shape and positions of the respective groove walls 26a, $26b_2$ are changed abruptly along the width direction of the pillar garnish $GL_1$. The transitional groove wall $W_3$ is constituted by the lower groove wall $26b_a$ shifting gradually outwardly from the lower groove wall $26b_1$ of the first groove wall $W_1$ to the lower groove wall $26b_2$ of the second groove wall $W_2$ at a portion of shifting from the first groove wall $W_1$ to the second groove wall $W_2$. The lower groove wall $26b_2$ may be linear or curved with respect to the longitudinal direction.

Therefore, the depth of the rain water gutter 27 is made to be substantially constant ($D_0$) at the first groove wall $W_1$ and the depth differs between the upper groove wall 26a and the lower groove wall $26b_2$ at the second groove wall $W_2$. That is, although the depth of the rain water gutter 27 at the portion of the upper groove wall 26a of the second groove wall $W_2$ is the same as that of the portion of the first groove wall $W_1$ ($D_0$), the depth of the rain water gutter 27 at the portion of the lower groove wall $26b_2$ becomes a depth ($D_2=D_0+D_1$) constituted by adding the depth ($D_0$) of the portion of the upper groove wall 26a and a dimension ($D_1$) of displacing the respective upper and lower groove walls 26a, $26b_2$ in the width direction of the pillar garnish $GL_1$. Incidentally, the mounting leg portion 24 is provided at the portion of the first groove wall $W_1$ but is not provided at the second groove wall $W_2$. Further, a height ($H_1$) of the lower groove wall $26b_2$ of the second groove wall $W_2$ is made to be larger than a thickness (T) of the wiper blade 11L on the left side and is designed to be a dimension by which the wiper blade 11L on the left side does not interfere with the second groove wall $W_2$ in a height direction in pivoting the wiper blade 11L on the left side.

As described above, in pivoting the wiper blade 11L on the left side, the lower groove wall $26b_2$ of the second groove wall $W_2$ of the lower end portion in the longitudinal direction of the pillar garnish $GL_1$ on the left side, which may be interfered with the wiper blade 11L when the wiper blade 11L is brought into an attitude proximate to the horizontal line, is arranged to displace outwardly, so that the rain water gutter 27 at the lower groove wall $26b_2$ of the second groove wall $W_2$ functions also as a space V for avoiding interference. Therefore, in pivoting the wiper blade 11L on the left side, the tip of the wiper blade can be avoided from interfering with the pillar garnish.

Further, as shown in FIG. 4, FIG. 5 and FIG. 7, at an end portion on the inward side of a remaining portion excluding an upper end portion in the longitudinal direction of the projection 21, an extended plate portion 34 directed to the vehicle inner side when the pillar garnish is attached to function also as the upper wall groove 26a is extended to the lower side. A height (h) of the extended plate portion 34 is gradually increased from an upper end in the longitudinal direction to a lower side. At a portion of the pillar garnish $GL_1$ provided with the extended plate portion 34, at the first groove wall $W_1$, the attaching plate portion 29 for attaching the first cushion piece 28 is formed at the lower end portion of the extended plate portion 34 to direct to the lower side (side of the window pane 3), and at the second groove wall $W_2$, the lower end portion of the extended plate portion 34 is formed with the attaching portion 29' via the connecting portion 35 skewedly inclined toward the peripheral panel 4 to the vehicle interior side to direct to the interior side from the extended plate portion 34 in a stepped shape. Therefore, a height (H) of the rain water gutter 27 is gradually increased from the upper end in the longitudinal direction of the pillar garnish $GL_1$ to the lower end in correspondence with the height (h) of the extended plate portion 34 [refer to FIG. 4 and FIG. 7]. Therefore, in addition to the fact that the height of the rain water gutter 27 is increased from the upper end in the longitudinal direction of the pillar garnish $GL_1$ to the lower end, at the portion of the second groove wall $W_2$ of the rain water gutter 27, the lower groove wall 26$b_2$ is displaced outwardly and also a depth thereof is increased and therefore, the volume of the rain water gutter 27 is increased at the portion of the second groove wall W$_2$. Therefore, in wiping rain water on the surface of the window pane 3 by the wiper blade 11L in running the automobile under rainy weather and receiving rain water collected to the left side edge of the window pane 3 to the rain water gutter 27 to flow it to the lower side, rainwater is facilitated to flow smoothly along the rain water gutter 27 of the pillar garnish GL$_1$ and is prevented from flowing toward the side window by riding over the ornamental head portion 22 of the pillar garnish GL$_l$ on the left side.

As shown in FIG. 5 and FIG. 7, at the portion of the second groove wall W$_2$ at the lower end portion in the longitudinal direction of the pillar garnish GL$_1$, the lower end portion in the height direction of the extended plate portion 34 is bent outwardly and the outward end portion is formed with the attaching plate portion 29' via the connecting portion 35 to direct to the vehicle interior side. That is, the attaching plate portion 29 of the first groove wall W$_1$ and the attaching plate portion 29' of the second groove wall W$_2$ are displaced in the width direction of the pillar garnish GL$_1$ and the extended plate portion 34 and the attaching plate portion 29' are connected by the connection portion 35. Therefore, at the portion of the second groove wall W$_2$, the first cushion piece 28 attached to the attaching plate portion 29' is more shifted outwardly than the portion of the first groove wall W$_1$ and becomes proximate to the outer peripheral end face 3$a$ of the window pane 3. Therefore, as shown in FIG. 6 and FIG. 7, although at the portion of the second groove wall W$_2$ at the lower end portion in the longitudinal direction of the pillar garnish GL$_1$, the first cushion piece 28 is brought into elastic contact with the surface of the window pane 3 at a portion at a distance of (D$_{12}$) from the outer peripheral end face 3$a$ of the window pane 3, at the portion of the first groove wall W$_1$ occupying the remaining large portion of the pillar garnish GL$_1$ excluding the second groove wall W$_2$, the first cushion piece 28 is brought into elastic contact with the surface of the window pane 3 at a distance (D$_{11}$) larger than the distance (D$_{12}$) from the outer peripheral end face 3$a$ of the window pane 3. Therefore, stability of attaching the pillar garnish GL$_1$ is not deteriorated. Further, as shown in FIG. 2 and FIG. 5, the transitional groove wall W$_3$ constituting the portion of connecting respective first and second groove walls W$_1$, W$_2$ constitutes a smooth curve in plane view. Thus, both of the bending rigidity and the torsional rigidity of the pillar garnish GL$_1$ are increased. Further, the above-described respective first and second groove walls W$_1$, W$_2$ may be formed also at the pillar garnish GR on the right side.

As described above, at the portion of the second groove wall W$_2$ at the lower end portion in the longitudinal direction of the pillar garnish GL$_1$, the lower groove wall 26$b_2$ is displaced outwardly, and the height (H$_1$) of the lower groove wall 26$b_2$ becomes higher than the thickness (T) of the wiper blade 11L toward the vehicle exterior side and is displaced also in the height direction. Therefore, even when the wiper blade 11L is brought into the attitude proximate to the horizontal line in pivoting the wiper blade 11L on the left side, the tip of the wiper blade 11L and the second groove wall W$_2$ are not interfered with each other. As a result, a position of one swinging end for making the wiper blade 11L substantially horizontal can be made to be proximate to be horizontal, and a wiping area of the wiper can be widened. Thus, an excellent front field of view can be ensured in running under rainy weather. Further, both of the depth (D$_2$) and the height (H) of the rain water gutter 27 are increased at the lower end side in the longitudinal direction of the pillar garnish GL$_1$ and therefore, the volume of the rain water gutter 27 is increased on the side of the lower end portion in the longitudinal direction of the pillar garnish GL$_1$. Water collected by the wiper blade 11L flows along a water flow path defined by the surfaces of the window pane 3, the tip of the wiper blade 11L and the second groove wall W$_2$, so that water can be prevented from flowing toward the side window by riding over the ornamental head portion 22. Thereby, a field of view of the side face of the automobile can be prevented from being deteriorated. Incidentally, in FIG. 1, a reference numeral 14 designates a circular arc constituting a trail of the tip of the wiper blade 11L on the left side. In FIG. 6 and FIG. 7, a reference numeral 36 designates an opaque colored layer of frit or the like provided at a peripheral edge portion of the back surface of the window pane 3 for making a surface side of an outer peripheral edge portion of the window pane 3 invisible.

[Second Embodiment]

Figure 8:
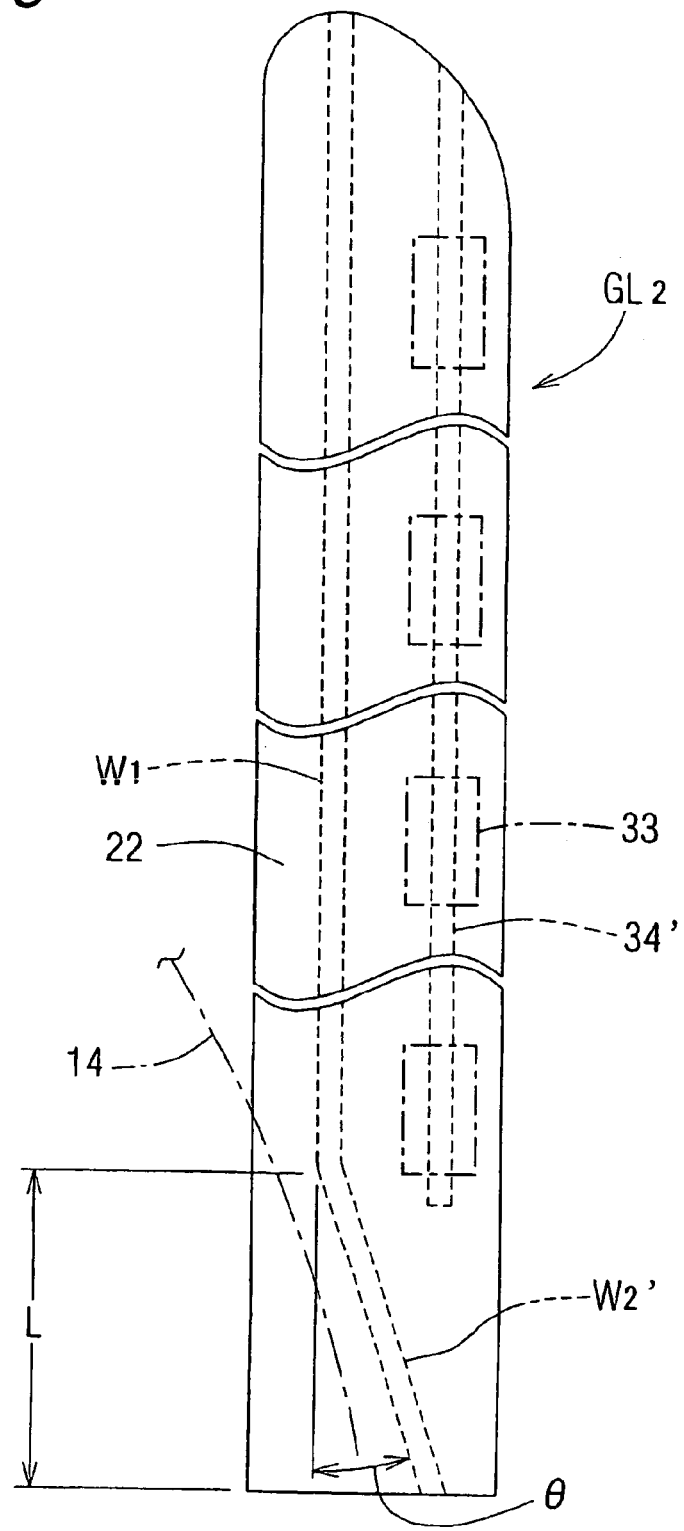
FIG. 8 is a front view showing a pillar garnish on a left side according to a second embodiment of the invention.
Figure 9:
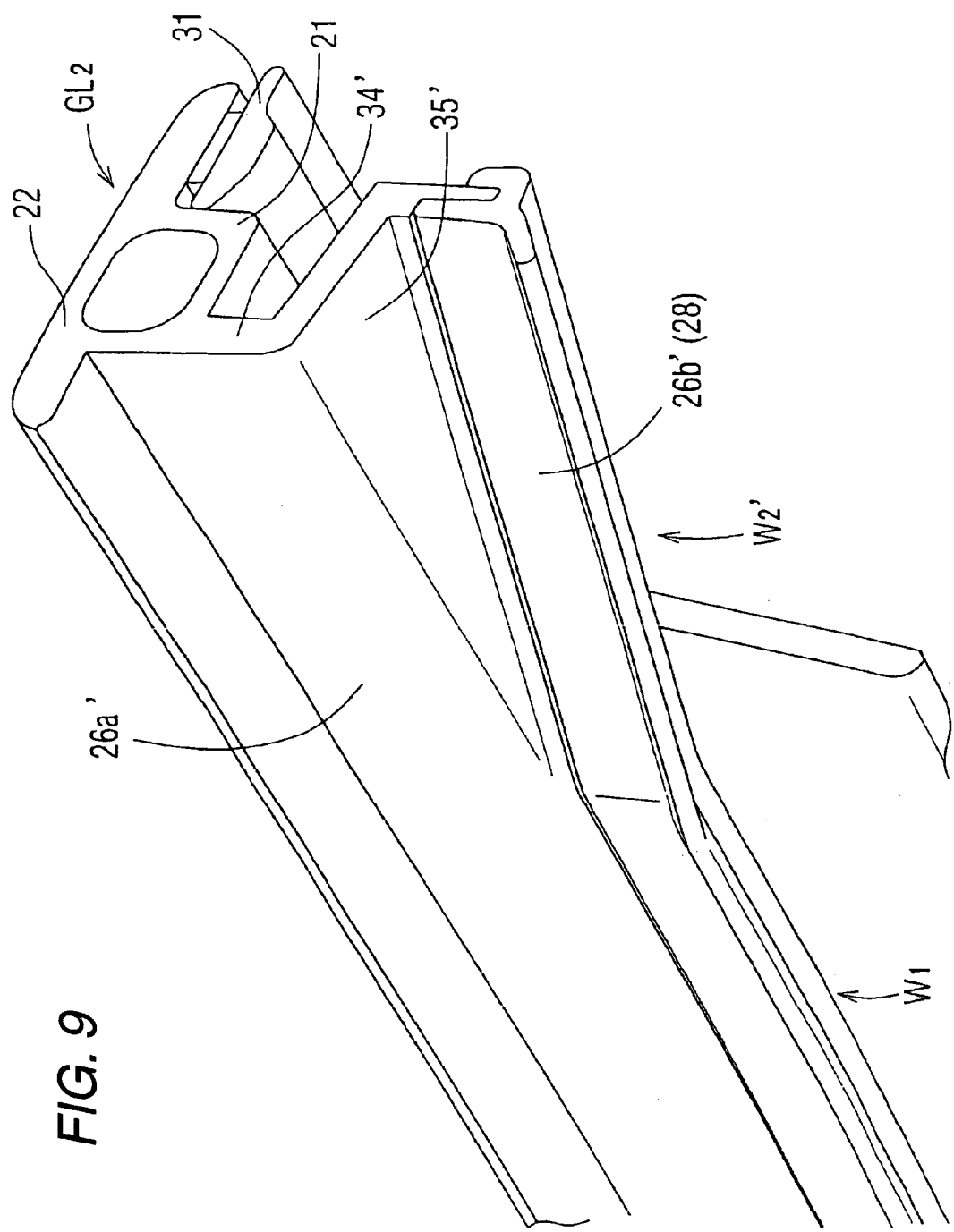
FIG. 9 is a partial perspective view viewed from a skewed lower direction and showing a portion of a second groove wall at a lower end portion of the pillar garnish on the left side.

FIG. 8 is a front view of a pillar garnish GL$_2$ on a left side according to a second embodiment of the invention. FIG. 9 is a partial perspective view viewed from a skewed lower direction and showing a portion of a second groove wall W$_2$' at a lower end portion of the pillar garnish GL$_2$. The pillar garnish GL$_2$ shown in FIG. 8 and FIG. 9 differs from the pillar garnish GL$_1$ of the first embodiment only in a shape of the second groove wall W$_2$' at the lower end portion in the longitudinal direction and other portions thereof are the same. That is, a lower groove wall 26$b$' of the second groove wall W$_2$' is shifted in a width direction considerably as proceeding to a lower end in the longitudinal direction of the pillar garnish GL$_2$, and an extended plate portion 34' and the lower groove wall 26$b$' are connected by a connecting portion 35' a width of which is widened as proceeding to the lower end in the longitudinal direction of the pillar garnish GL$_2$. Therefore, although an upper groove wall 26$a$' constituting the second groove wall W$_2$' is the same as that of the pillar garnish GL$_1$, the lower groove wall 26$b$' is inclined outward by an angle (θ) relative to the longitudinal direction of the pillar garnish in front view in correspondence with a swinging locus 14 of the tip of the wiper blade 11L on the left side. Thereby, interference with the wiper blade 11L on the left side can be avoided and there is also achieved an advantage that water flow at the portion of the second groove wall W$_2$' becomes smooth since the volume of the rain water gutter 27 is gradually increased at the second groove wall W$_2$'. Incidentally, the groove wall 26$b$' may be a linear shape or a curved shape with respect to the longitudinal direction.

Further, although an explanation has been given of the pillar garnish GL$_1$, GL$_2$ on the left side which are attached to the front pillar PL on the left side in the case of a vehicle with a right-hand steering wheel, the first and second embodiments are also applicable to a vehicle with a left-hand steering wheel. In addition to the pillar garnish on the left side, a pillar garnish having a symmetric shape with respect to the left side one may be attached along the front pillar on the right side.

Further, a pillar garnish may be formed into a shape of a gate in which a portion of the pillar garnish extending along the upper portion of the window pane 3 is integrally formed with portions of the pillar garnish extending along both left and right front pillars. Or, a pillar garnish that extends to a rear side of a vehicle from a front pillar continuously along a roof side as shown by a two-dotted chain line in FIG. 1 is also applicable.

What is claimed is:

1. A front pillar garnish comprising:

an ornamental head portion that is separate from a surface of a window pane to a vehicle exterior side and covers a gap between an outer peripheral end face of the window pane and a window opening formed in a body panel when the front pillar garnish is mounted to the predetermined position of the body panel, the ornamental head portion having an inward end;

a groove wall that protrudes from a back surface side of the ornamental head portion toward the surface of the window pane and defines a rain water gutter in cooperation with the surface of the window pane; and a mounting leg portion that protrudes from the back surface side of the ornamental head portion toward the gap for mounting the front pillar garnish to an outer peripheral edge of the window pane and/or to the window opening of the body panel;

wherein the groove wall comprises:

a first groove wall that is positioned at an upper side in a longitudinal direction of the front pillar garnish when the front pillar garnish is mounted to the predetermined position of the body panel; and a second groove wall that is positioned at a lower side in the longitudinal direction of the front pillar garnish when the front pillar garnish is mounted to the predetermined position of the body panel;

wherein a maximum distance in a direction toward the outer peripheral end face of the window pane from the inward end of the ornamental head portion to the second groove wall is larger than a maximum distance in the direction toward the outer peripheral end face of the window pane from the inward end of the ornamental head portion to the first groove wall to thereby make a depth of the rain water gutter large at the lower side in the longitudinal direction of the front pillar garnish; and wherein when a tip end of a wiper blade reaches the lowest position, the surface of the window pane, the tip end of the wiper blade and the second groove wall define a water flow path through which water is allowed to flow along the rain water gutter.

2. The front pillar garnish according to claim 1, wherein the front pillar garnish is attachable to a left side front pillar of a vehicle with a right-hand steering wheel or to a right side front pillar of a vehicle with a left-hand steering wheel.

3. The front pillar garnish according to claim 1, wherein the second groove wall is located at a position that is lower than an intermediate portion of the front pillar garnish in the longitudinal direction of the front pillar garnish, and a distance between the inward end of the ornamental head portion and the second groove wall is made larger than a distance between the inward end of the ornamental head portion and the first groove wall.

4. The front pillar garnish according to claim 3, wherein the first groove wall and the second groove wall are curvedly connected.

5. The front pillar garnish according to claim 4, further comprising a transitional groove wall that connects the first groove wall and the second groove wall and extends in a direction that crosses an extending direction of the first groove wall.

6. The front pillar garnish according to claim 4, wherein the second groove wall is connected to the first groove wall while extending in a direction that crosses an extending direction of the first groove wall.

7. The front pillar garnish according to claim 1, wherein a height of the groove wall which is a distance between a base end portion of the groove wall on the back surface side of the ornamental head portion and the surface of the window pane is made higher in the second groove wall than in the first groove wall.

8. The front pillar garnish according to claim 1, further comprising a cushion member made of a polymer material that is softer than a material of the groove wall, the cushion member being attached to a top end portion of the groove wall on a window pane side.

9. The front pillar garnish according to claim 1, wherein the second groove wall comprises:

a vehicle exterior side portion on an ornamental head portion side; and a vehicle interior side portion on a window pane surface side, the vehicle interior side portion having a height larger than a thickness of the wiper blade, the vehicle interior side portion being positioned closer to a window pane outer peripheral edge side in a width direction of the front pillar garnish than the vehicle exterior side portion; and a connecting portion that connects the vehicle exterior side portion and the vehicle interior side portion in a stepwise manner.

* * * * *